United States Patent
Fuse (10) Patent No.: US 6,659,819 B2
(45) Date of Patent: Dec. 9, 2003

(54) DRIVE SHAFT CONNECTING STRUCTURE

(75) Inventor: Tomohiro Fuse, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/218,575

(22) Filed: Aug. 15, 2002

(65) Prior Publication Data

US 2003/0054710 A1 Mar. 20, 2003

(30) Foreign Application Priority Data

Sep. 18, 2001 (JP) ........................................ 2001-284066

(51) Int. Cl.[7] .............................................. B63H 23/24
(52) U.S. Cl. .............................. 440/83; 440/38; 464/73
(58) Field of Search ............................ 440/38, 83, 111, 440/112; 464/73, 88, 89; 123/192.2

(56) References Cited

U.S. PATENT DOCUMENTS

| | | | | |
|---|---|---|---|---|
| 2,301,660 A | * | 11/1942 | Ricefield | 464/73 |
| 2,502,790 A | * | 4/1950 | Jencick | 464/73 |
| 2,588,158 A | * | 3/1952 | Peirce | 464/73 |
| 3,362,191 A | * | 1/1968 | Louette | 464/88 |
| 3,638,454 A | * | 2/1972 | Croset | 464/76 |
| 3,837,179 A | * | 9/1974 | Barth | 464/76 |
| 3,884,049 A | * | 5/1975 | Pauli | 464/73 |
| 3,940,947 A | * | 3/1976 | Ahlen | 464/85 |
| 4,037,431 A | * | 7/1977 | Sugimoto | 464/73 |
| 4,722,707 A | * | 2/1988 | Murase | 440/38 |
| 4,772,245 A | * | 9/1988 | Readman et al. | 464/89 |
| 4,925,408 A | * | 5/1990 | Webb et al. | 440/38 |
| 5,282,444 A | * | 2/1994 | Ito et al. | 123/192.2 |
| 5,720,638 A | * | 2/1998 | Hale | 440/83 |
| 6,019,684 A | * | 2/2000 | Hoyt et al. | 464/88 |
| 6,024,644 A | * | 2/2000 | Hoyt et al. | 464/88 |
| 6,123,620 A | * | 9/2000 | Polakowski | 464/73 |

FOREIGN PATENT DOCUMENTS

JP 7-112697 A 5/1995

* cited by examiner

Primary Examiner—S. Joseph Morano
Assistant Examiner—Lars A. Olson
(74) Attorney, Agent, or Firm—Birch, Stewart, Kolasch & Birch, LLP (57) ABSTRACT

To ensure that fitting a coupler rubber in a reverse condition will be prevented, and to ensure that the fitting direction of the coupler rubber can be visually checked even after the fitting. A driving-side coupler is provided on an end of an output shaft of an engine. A driven-side coupler is provided on an end of a drive shaft. A coupler rubber is disposed between the couplers. At least a portion of the coupler rubber is exposed between the couplers, and the exposed portion is provided with a mark indicating the fitting direction of the coupler rubber.

19 Claims, 7 Drawing Sheets

FIG. 7
BACKGROUND ART

DRIVE SHAFT CONNECTING STRUCTURE

CROSS-REFERENCE TO RELATED APPLICATIONS

This application claims priority under 35 U.S.C. §119 on Application No. 2001-284066, filed in Japan on Sep. 18, 2001, the entirety of which is hereby incorporated by reference.

BACKGROUND OF THE INVENTION

1. Field of the Invention

The present invention relates to a drive shaft connecting structure. More particularly, the present invention relates to a drive shaft connecting structure in which an end of an output shaft of an engine and an end of a drive shaft are connected together through a coupler.7

2. Description of Background Art

Figure 7:
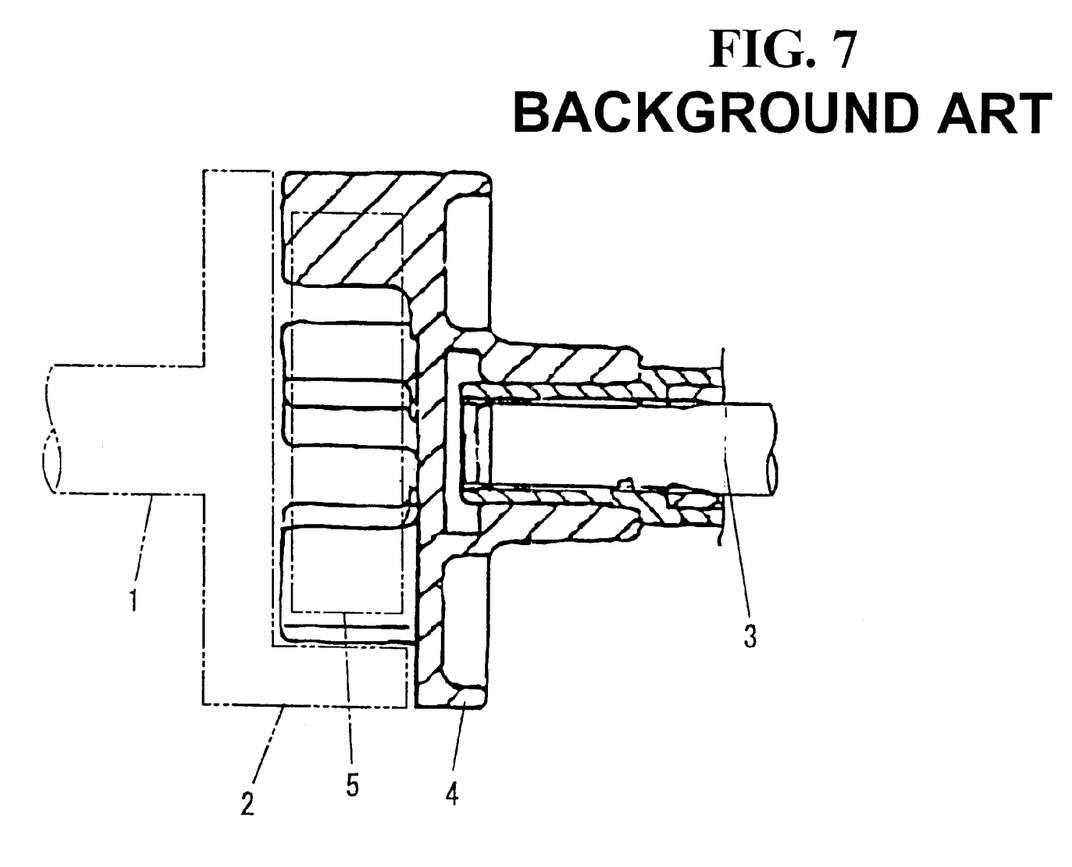
FIG. 7 is an illustration of the background art.

A drive shaft connecting structure according to the background art is known, for example from Japanese Patent Laid-open No. Hei 7-112697, which is shown in FIG. 7 of the present invention.

This drive shaft connecting structure according to the above document includes a driving-side coupler 2 provided on an end of an output shaft 1 of an engine (not shown). A driven-side coupler 4 is provided on an end of a drive shaft 3. Furthermore, a coupler rubber 5 is disposed between the couplers 2 and 4.

The coupler rubber 5 plays the roll of a shock absorber. Power from the output shaft 1 of the engine is transmitted from the driving-side coupler 2 to the driven-side coupler 4 and the drive shaft 3 through the coupler rubber 5.

In the drive shaft connecting structure as described above, generally, the driving-side coupler 2 and the driven-side coupler 4 are in many cases roughly symmetrical with respect to the front and rear sides (the driving side and the driven side). Accordingly, the coupler rubber 5 is also in many cases roughly symmetrical or perfectly symmetrical with respect to the front and rear sides.

Therefore, in the structure according to the background art, the coupler rubber is often been fitted by a worker during assembly in a reversed condition, i.e., with the front and rear sides reversed.

If the coupler rubber is perfectly symmetrical with respect to the front and rear sides, no problem is generated. However, there are some coupler rubbers, which are roughly symmetrical but not perfectly symmetrical with respect to the front and rear sides. Accordingly, if such a coupler rubber is fitted in a reverse condition, it presents a problem in that the transmission of power from the driving-side coupler to the driven-side coupler through the coupler rubber would differ.

SUMMARY OF THE INVENTION

It is an object of the present invention to provide a drive shaft connecting structure by which the above-mentioned problem is solved and it is ensured that the situation of fitting the coupler rubber in a reverse condition would occur with difficulty.

In order to attain the above object, a drive shaft connecting structure according to a first aspect of the present invention includes a driving-side coupler provided on an end of an output shaft of an engine. A driven-side coupler is provided on an end of a drive shaft. A coupler rubber is disposed between the couplers. Furthermore, at least a portion of the coupler rubber is exposed between the couplers, and the exposed portion is provided with a mark indicating the fitting direction of the coupler rubber.

According to the drive shaft connecting structure described above, the following actions and effects are obtained. Specifically, the coupler rubber is provided with a mark indicating the fitting direction thereof. According, the assembling worker can perform a fitting operation while looking at the mark. Therefore, the situation of fitting the coupler rubber in a reverse condition would occur with difficulty.

In addition, according to the drive shaft connecting structure described above, at least a portion of the coupler rubber is exposed between the couplers and the exposed portion is provided with the mark indicating the fitting direction of the coupler, rubber. Accordingly, whether or not the coupler rubber is fitted correctly can be visually checked even after the coupler rubber is fitted between the couplers. As a result, according to the drive shaft connecting structure described above, desired power transmission can be obtained securely.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 4(a) to 4(c) are views illustrating a driven-side coupler 23b, in which

FIGS. 5(a) to 5(d) are views illustrating a coupler rubber 40, in which

FIGS. 6(a) and 6(b) are views illustrating a fitting condition of the coupler rubber 40 to the coupler 23, in which

DETAILED DESCRIPTION OF THE INVENTION

Figure 1:
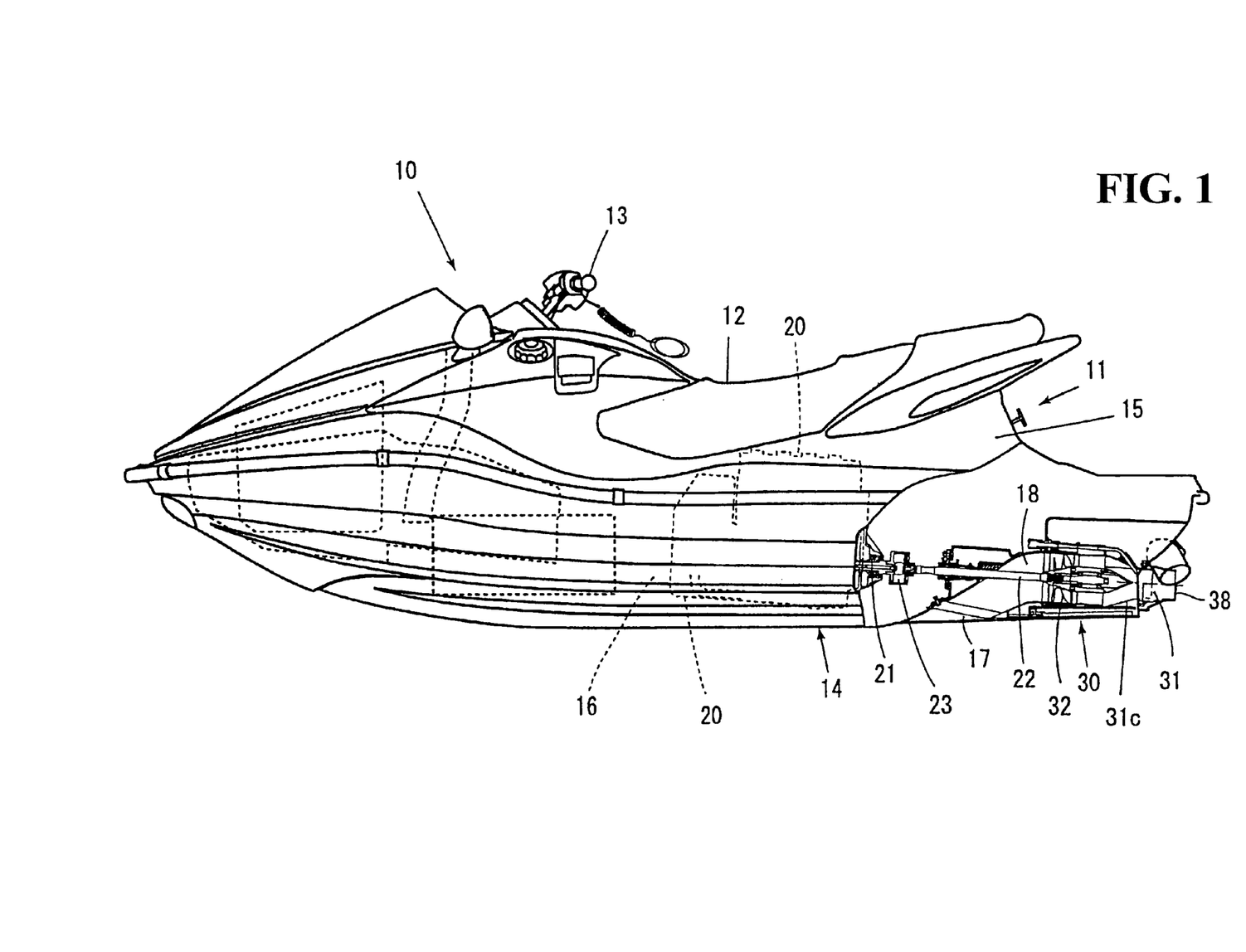
FIG. 1 is a partially cut-away, side view illustrating one example of a personal watercraft using one embodiment of a drive shaft connecting structure according to the present invention.
Figure 2:
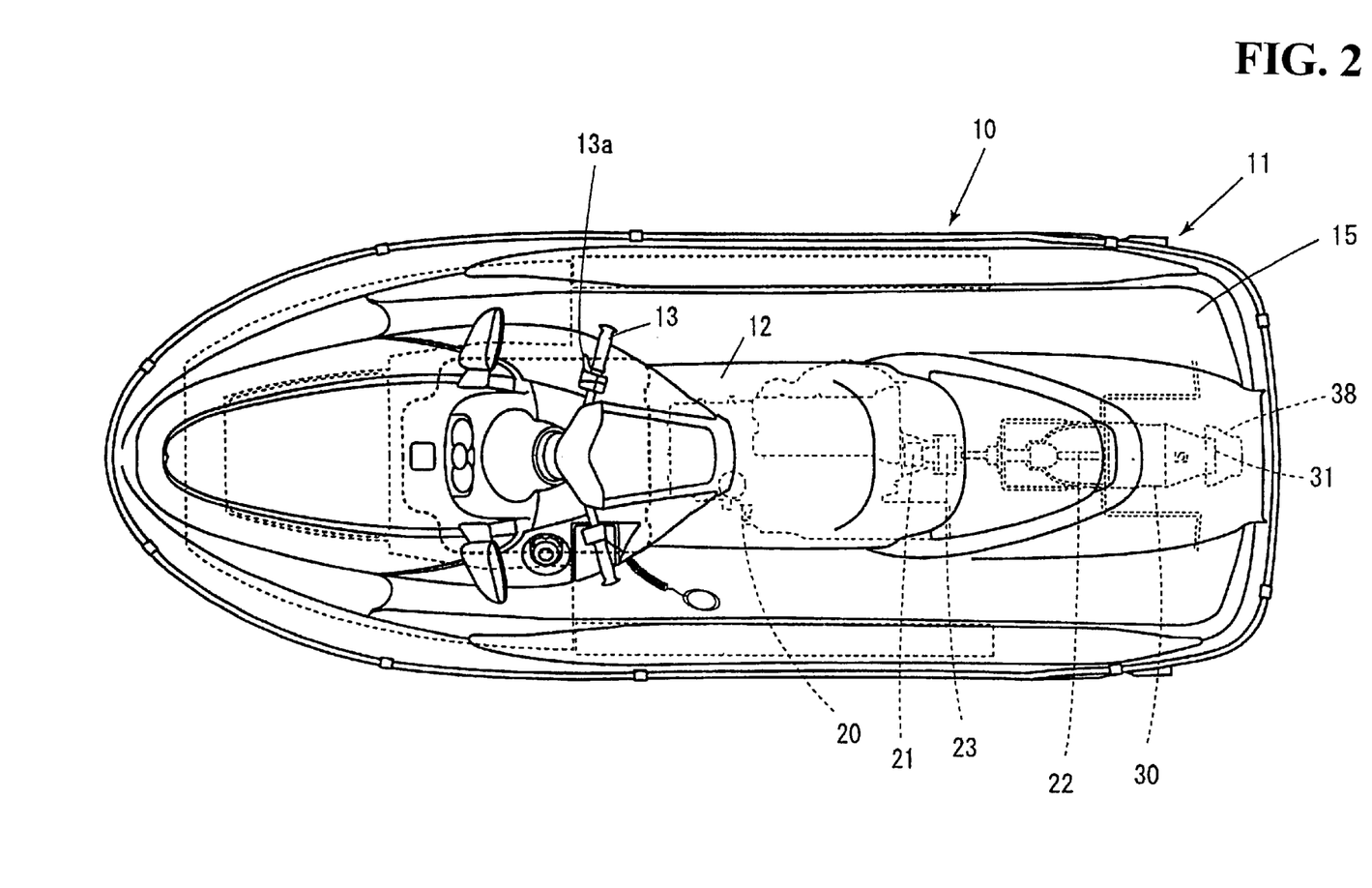
FIG. 2 is a plan view of FIG. 1.

The present invention will now be described below with reference to the accompanying drawings. FIG. 1 is a partly cut-away side view illustrating one example of a personal watercraft using one embodiment of a drive shaft connecting structure according to the present invention. FIG. 2 is a plan view of FIG. 1.

As shown in the above figures (mainly FIG. 1), the personal watercraft 10 is a saddle ride type small watercraft, in which the driver is seated on a seat 12 on a boat body 11. The personal watercraft 10 can be operated by gripping a steering handle 13 provided with a throttle lever.

The boat body 11 is a buoyancy structure including a hull 14 and a deck 15 jointed to each other so as to form a space 16 inside the body. In the space 16, an engine 20 is mounted on the hull 14. A jet pump (jet propulsion pump) 30 as a propulsion means driven by the engine 20 is provided at a rear portion of the hull 14.

The jet pump 30 includes an impeller 32 disposed in a conduit 18 extending from a water intake port 17 opening at the boat bottom to a jet port 31 opening at the rear end of the boat body and a deflector 38. A shaft (drive shaft) 22 for driving the impeller 32 is connected to an output shaft 21 (See FIG. 3) of the engine 20 through a coupler 23 (a driving-side coupler 23a and a driven-side coupler 23b shown in FIG. 3). Therefore, when the impeller 32 is rotationally driven by the engine 20 through the coupler 23 and the drive shaft 22, water taken in through the water intake port 17 is jetted out from the jet port 31 through the deflector 38, whereby the boat body 11 is propelled. The driving rotational frequency of the engine 20; namely, the propulsion force of the jet pump 30 is operated by a turning operation of the throttle lever 13a (See FIG. 2) at the operating handle 13. The deflector 38 is connected to the operating handle 13 by an operation wire (not shown), and is turned by operation of the handle 13. Accordingly, the course of the boat body 11 can be changed.

Figure 3:
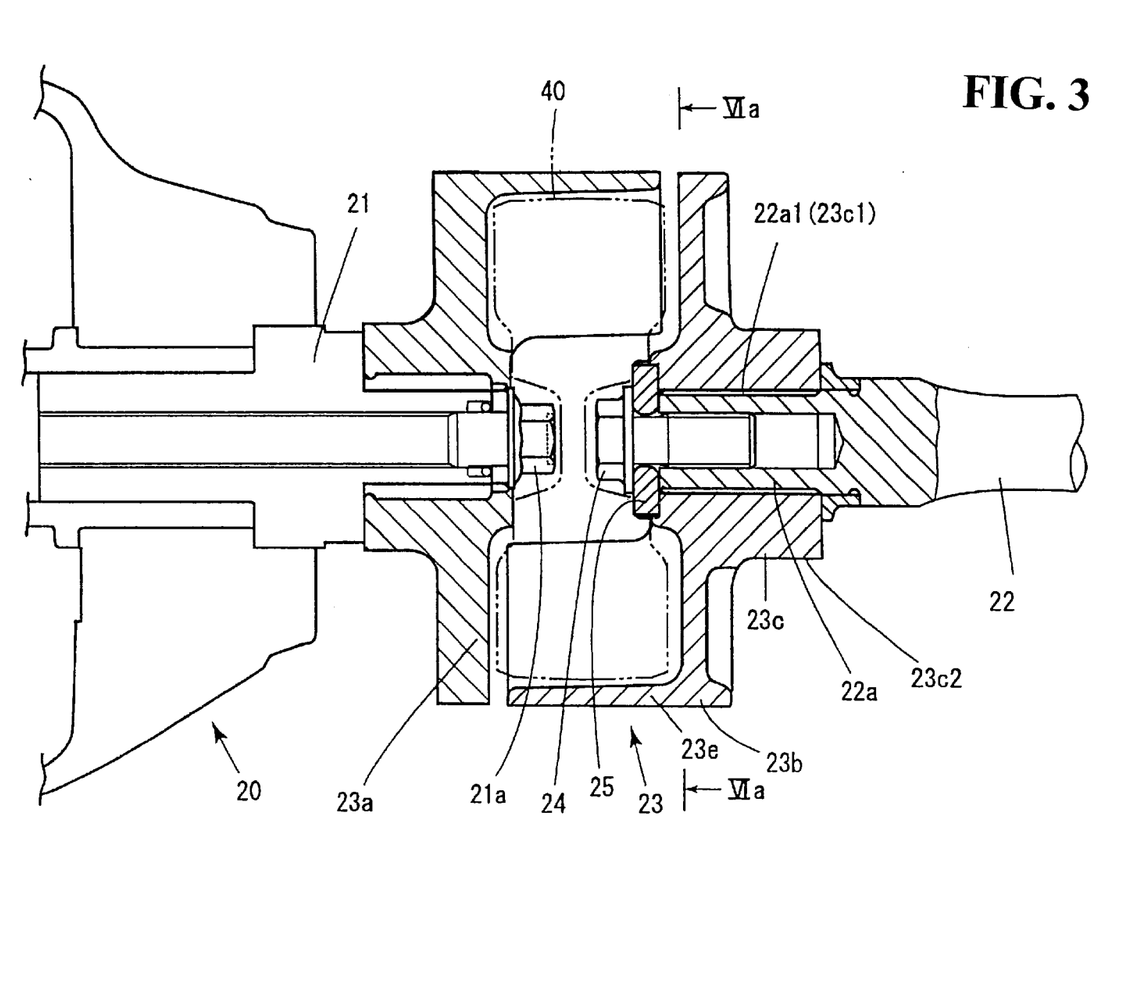
FIG. 3 is a sectional view illustrating a connecting structure between an output shaft 21 of an engine 20 and a drive shaft 22.

FIG. 3 is a sectional view illustrating a connecting structure between the output shaft 21 of the engine 20 and the drive shaft 22. As shown in this figure, the drive shaft 22 has a front end portion 22a connected to the output shaft 21 of the engine 20 through the coupler 23. As described above, the engine 20 is mounted on the boat body 11.

The coupler 23 includes the driving-side coupler 23a, the driven-side coupler 23b, and a coupler rubber 40 disposed between the couplers 23a and 23b. The driving-side coupler 23a is detachably fixed to the output shaft 21 of the engine 20 by a bolt 21a. The driven-side coupler 23b is detachably fixed to the front end portion 22a of the drive shaft 22 by a bolt 24.

Figures 4A, 4B:
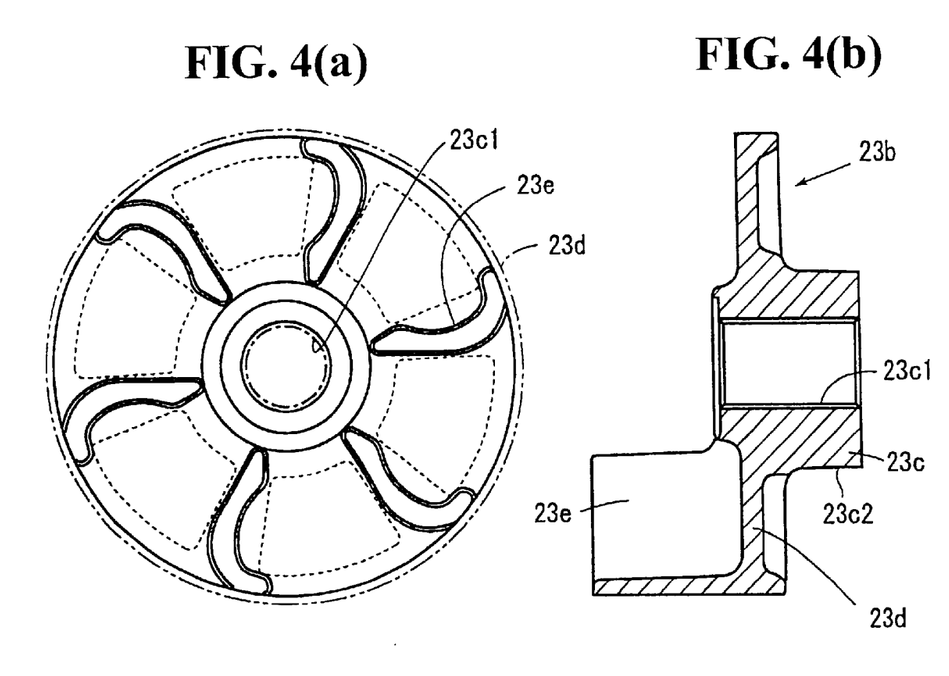
FIG. 4(a) is a partly omitted front view from the front side of the running direction of the boat body.
FIG. 4(b) is a side sectional view taken along line b—b of FIG. 4(c))
Figure 4C:
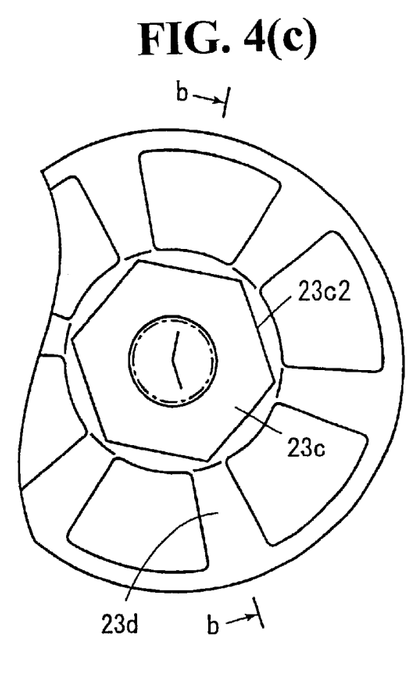
FIG. 4(c) is a partly omitted rear view from the rear side of the boat body.

FIGS. 4(a) to 4(c) illustrate the driven-side coupler 23b. The driven-side coupler 23b includes a boss portion 23c, a flange portion 23d integral with the boss portion 23c, and an engaging portion 23e integral with the flange portion 23d. The engaging portion 23e projects toward the side of the driving-side coupler 23a.

An inside surface of the boss portion 23c is provided with splines 23c1 to be engaged with splines 22a1 (See FIG. 3) provided on the outer circumference of a front end portion 22a of the drive shaft 22. An outer circumference surface 23c2 of the boss portion 23c is formed in the shape of a hexagonal nut.

Therefore, the driven-side coupler 23b is detachably and firmly fixed to the front end of the drive shaft 22 by engaging the splines 23c1 of the boss portion 23c to the splines 22a1 at the front end portion of the shaft, as shown in FIG. 3, and fastening them with a bolt 24 through a washer 25. The fastening operation can be easily performed by holding the hexagonal nut portion 23c2 of the boss portion 23c with a tool.

The driving-side coupler 23a has the same basic shape as that of the driven-side coupler 23b (symmetrical with respect to the front and rear directions). The driving-side coupler 23a is detachably fixed to the output shaft 21 of the engine 20 by the bolt 21a in the same manner described above with regard to the driven-side coupler 23b.

Figure 5A:
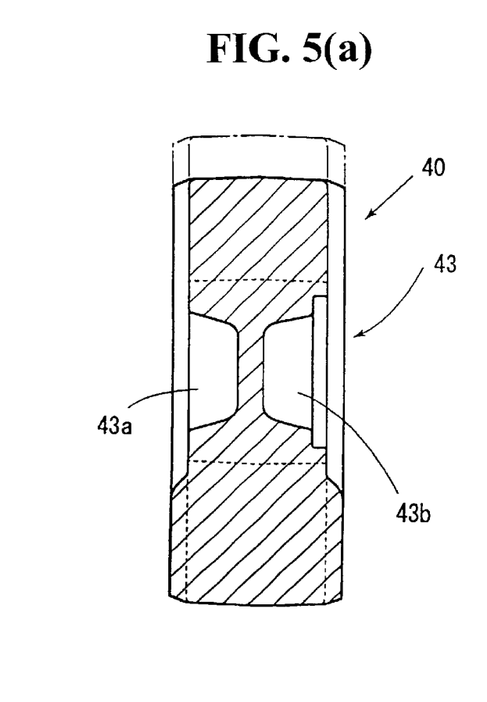
FIG. 5(a) is a side sectional view taken along line a—a of FIG. 5(b)
Figure 5B:
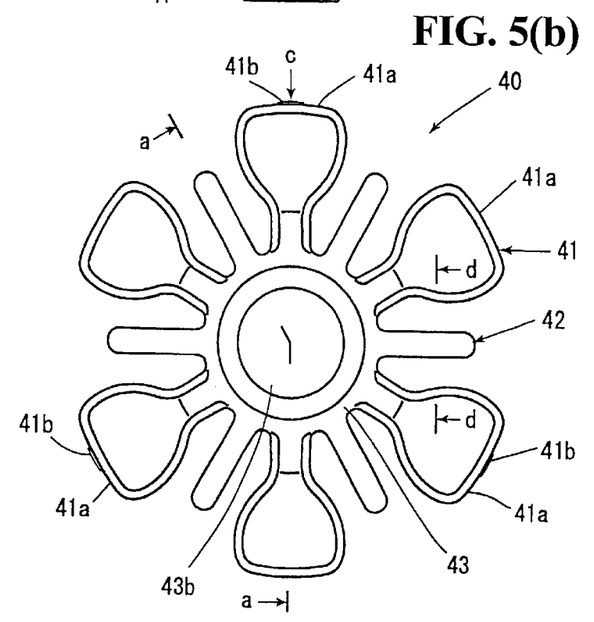
FIG. 5(b) is a rear view from the rear side of the boat body.
Figure 5C:
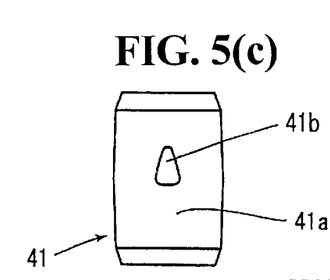
FIG. 5(c) is a view taken in the direction of arrow c of FIG. 5(b)
Figure 5D:
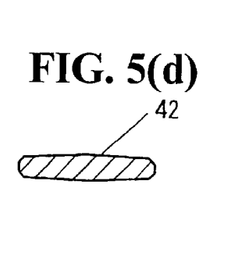
FIG. 5(d) is a sectional view taken along line d—d of FIG. 5(b)
Figure 6A:
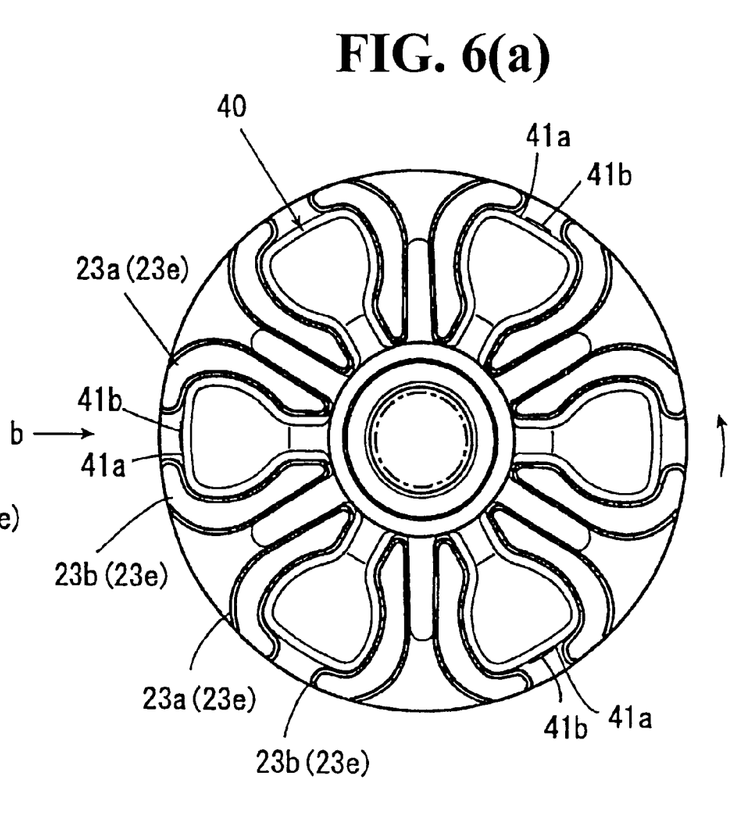
FIG. 6(a) is a view taken along line VIa—VIa of FIG. 3.
Figure 6B:
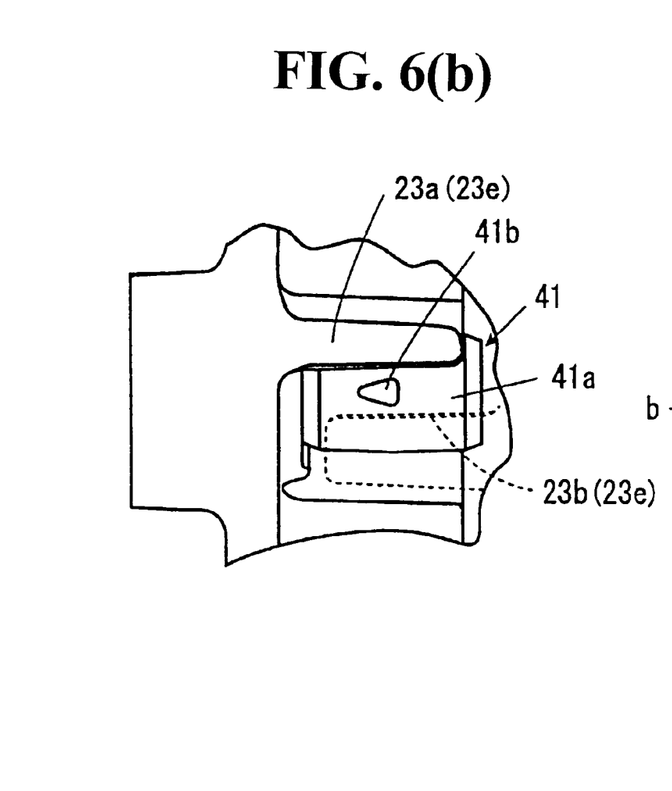
FIG. 6(b) is a view taken in the direction of arrow b of FIG. 6(a)

FIGS. 5(a) to 5(d) illustrates the coupler rubber 40. FIGS. 6(a) and 6(b) illustrate a fitting condition of the coupler rubber 40 to the coupler 23. As shown in FIG. 5(b), the coupler rubber 40 includes a central portion 43, six first damper portions 41 and six second damper portions 42. The six first damper portions 41 extend radially from and integrally with the central portion 43. The six second damper portions 42 extend radially from and integrally with the central portion 43. As shown in FIG. 6(a), the first and second damper portions 41, 42 are disposed between the driving-side coupler 23a and the driven-side coupler 23b so as to be intermediately disposed between an engaging portion 23e of the driving-side coupler 23a and an engaging portion 23e of the driven-side coupler 23b. As shown in FIG. 5(a), the central portion 43 of the coupler rubber 40 is provided with a recess 43a for receiving a head portion of the fitting bolt 21a for the driving-side coupler 23a, and a recess 43b for receiving a head portion of the fitting bolt 24 for the driven-side coupler 23 and the washer 25.

In the condition where the coupler rubber 40 is disposed (fitted) between the driving-side coupler 23a and the driven-side coupler 23b as described above, portions 41a of the outer circumferential surface of the first damper portions 41 are exposed (can be seen) between the engaging portions 23e of the couplers 23a and 23b, as shown in FIG. 6. The exposed portions 41a are each provided with a mark 41b indicating the fitting direction of the coupler rubber 40. In this embodiment, the exposed portions 41a at three alternate ones of the six first damper portions 41 are each provided with a roughly isosceles triangular mark 41b by embossing. As is clear from FIG. 6(b), the apex (left side in the figure) of the mark 41b indicates the front side (engine side) of the boat body.

The drive shaft connecting structure as described above includes the driving-side coupler 23a provided on the side of the output shaft 21 of the engine 20, the driven-side coupler 23b provided on the side of the drive shaft 22, and the coupler rubber 40 disposed between both the couplers 23a and 23b. At least a portion 41a of the coupler rubber 40 is exposed between the couplers 23a and 23b, and the exposed portion 41a is provided with the mark 41b indicating the fitting direction of the coupler rubber 40. Therefore, according to this drive shaft connecting structure, the following actions and effects can be obtained.

Namely, the coupler rubber 40 is provided with the mark 41b indicating the fitting direction thereof. Accordingly, the assembling worker can perform the fitting operation while looking at the mark 41b. Therefore, the situation of fitting the coupler rubber 40 in a reverse condition would occur with difficulty.

Moreover, according to the drive shaft connecting structure described above, at least a portion 41a of the coupler rubber 40 is exposed between the couplers 23a and 23b and the exposed portion 41a is provided with the mark 41b indicating the fitting direction of the coupler rubber 40. Accordingly, whether or not the coupler rubber 40 is fitted correctly can be visually checked even after the coupler rubber 40 is fitted between the couplers 23a and 23b.

As a result, according to the drive shaft connecting structure described above, desired power transmission can be obtained securely.

The invention being thus described, it will be obvious that the same may be varied in many ways. Such variations are not to be regarded as a departure from the spirit and scope of the invention, and all such modifications as-would be obvious to one skilled in the art are intended to be included within the scope of the following claims.

What is claimed is:

1. A drive shaft connecting structure, comprising:

a driving-side coupler, said driving-side coupler being provided on an end of an output shaft of an engine;

a driven-side coupler, said driven-side coupler being provided on an end of a drive shaft; and a coupler rubber disposed between said driving-side coupler and said driven-side coupler, wherein at least a portion of said coupler rubber is exposed between said driving-side coupler and said driven-side coupler, and said exposed portion is provided with a mark indicating a fitting direction of said coupler rubber.

2. The drive shaft connecting structure according to claim 1, wherein said mark is a triangular mark having an apex pointing toward said driving-side coupler.

3. The drive shaft connecting structure according to claim 1, wherein said driven-side coupler includes a boss portion, a flange portion integral with said boss portion, and an engaging portion integral with said flange portion, said engaging portion projecting toward said driving-side coupler.

4. The drive shaft connecting structure according to claim 3, wherein an inside surface of said boss portion is provided with splines, said splines being engageable with splines provided on an outer circumference of said end of said drive shaft, and an outer circumference surface of said boss portion is formed in a shape of a hexagonal nut.

5. The drive shaft connecting structure according to claim 1, wherein said driving-side coupler includes a boss portion, a flange portion integral with said boss portion, and an engaging portion integral with said flange portion, said engaging portion projecting toward said driven-side coupler.

6. The drive shaft connecting structure according to claim 5, wherein an inside surface of said boss portion is provided with splines, said splines being engageable with splines provided on an outer circumference of said end of said output shaft, and an outer circumference surface of said boss portion is formed in a shape of a hexagonal nut.

7. The drive shaft connecting structure according to claim 1, wherein said coupler rubber includes a central portion, a plurality of first damper portions and a plurality of second damper portions, said plurality of first damper portions extending radially from and integrally with said central portion, said plurality of second damper portions extending radially from and integrally with said central portion to an extent less than the said plurality of first damper portions.

8. The drive shaft connecting structure according to claim 7, wherein said first and second damper portions are disposed between said driving-side coupler and said driven-side coupler so as to be intermediately disposed between an engaging portion of said driving-side coupler and an engaging portion of said driven-side coupler.

9. The drive shaft connecting structure according to claim 1, wherein said central portion of said coupler rubber is provided with a first recess for receiving a head portion of a fitting bolt for said driving-side coupler, and a second recess for receiving a head portion of a fitting bolt for said driven-side coupler and a washer.

10. The drive shaft connecting structure according to claim 1, wherein said engine is mounted in a boat body of a personal watercraft.

11. A drive shaft connecting structure, comprising:

a driving-side coupler, said driving-side coupler being mountable on an end of an output shaft of an engine;

a driven-side coupler, said driven-side coupler being mountable on an end of a drive shaft; and a coupler rubber disposed between said driving-side coupler and said driven-side coupler, wherein at least a portion of said coupler rubber is exposed between said driving-side coupler and said driven-side coupler, and said exposed portion is provided with a mark indicating a fitting direction of said coupler rubber.

12. The drive shaft connecting structure according to claim 11, wherein said mark is a triangular mark having an apex pointing toward said driving-side coupler.

13. The drive shaft connecting structure according to claim 11, wherein said driven-side coupler includes a boss portion, a flange portion integral with said boss portion, and an engaging portion integral with said flange portion, said engaging portion projecting toward said driving-side coupler.

14. The drive shaft connecting structure according to claim 13, wherein an inside surface of said boss portion is provided with splines, said splines being engageable with splines provided on an outer circumference of the end of the drive shaft, and an outer circumference surface of said boss portion is formed in a shape of a hexagonal nut.

15. The drive shaft connecting structure according to claim 11, wherein said driving-side coupler includes a boss portion, a flange portion integral with said boss portion, and an engaging portion integral with said flange portion, said engaging portion projecting toward said driven-side coupler.

16. The drive shaft connecting structure according to claim 15, wherein an inside surface of said boss portion is provided with splines, said splines being engageable with splines provided on an outer circumference of the end of the output shaft, and an outer circumference surface of said boss portion is formed in a shape of a hexagonal nut.

17. The drive shaft connecting structure according to claim 11, wherein said coupler rubber includes a central portion, a plurality of first damper portions and a plurality of second damper portions, said plurality of first damper portions extending radially from and integrally with said central portion, said plurality of second damper portions extending radially from and integrally with said central portion to an extent less than the said plurality of first damper portions.

18. The drive shaft connecting structure according to claim 17, wherein said first and second damper portions are disposed between said driving-side coupler and said driven-side coupler so as to be intermediately disposed between an engaging portion of said driving-side coupler and an engaging portion of said driven-side coupler.

19. The drive shaft connecting structure according to claim 11, wherein said central portion of said coupler rubber is provided with a first recess for receiving a head portion of a fitting bolt for said driving-side coupler, and a second recess for receiving a head portion of a fitting bolt for said driven-side coupler and a washer.

* * * * *